United States Patent [19]
Mathews

[11] 4,077,271
[45] Mar. 7, 1978

[54] DRIVE POWER TRANSMISSION ELEMENT

[75] Inventor: Frederic M. Mathews, Lumberton, N.C.

[73] Assignees: Walter M. Mathews; Bertha B. Mathews, both of Lumberton, N.C.; a part interest to each

[21] Appl. No.: 591,941

[22] Filed: Jun. 30, 1975

Related U.S. Application Data

[63] Continuation-in-part of Ser. No. 551,116, Feb. 19, 1975, abandoned, which is a continuation-in-part of Ser. No. 304,967, Nov. 15, 1972, abandoned, which is a continuation-in-part of Ser. No. 200,976, Nov. 22, 1971, abandoned.

[51] Int. Cl.² ............................................. F16H 55/36
[52] U.S. Cl. .............................. 74/230.24; 74/230.05; 74/230.5; 74/229; 254/190 R
[58] Field of Search ................ 74/230.5, 229, 230.24; 254/190 R, 191; 226/183

[56] References Cited

U.S. PATENT DOCUMENTS

| 587,806 | 8/1897 | Fox | 74/230.5 |
| 2,802,366 | 8/1957 | Borner | 74/230.5 |
| 3,302,932 | 2/1967 | Wallin | 74/230.5 X |
| 3,714,838 | 2/1973 | Gilson | 74/230.5 X |
| 3,844,537 | 10/1974 | Rinio | 74/230.5 X |
| 3,881,361 | 5/1975 | Newell | 74/230.24 |

Primary Examiner—Allan D. Herrmann
Assistant Examiner—Allan R. Burke
Attorney, Agent, or Firm—Clarence A. O'Brien; Harvey B. Jacobson

[57] ABSTRACT

A drive power transmission element in the form of a wheel adapted to be mounted non-rotatably on a shaft or axle in which the wheel has a peripheral surface provided with a unique groove receiving a flexible power transmission element, such as a rope, in which the groove is provided with a plurality of circumferentially spaced impressions which are radially and circumferentially curved in configuration and which taper or converge on the line of circumference rather than along the radii of the wheel.

2 Claims, 5 Drawing Figures

DRIVE POWER TRANSMISSION ELEMENT

BACKGROUND OF THE INVENTION

1. Field of the Invention

The present invention generally relates to a power transmission element incorporating a drive connection between a rotatable wheel and a flexible drive or driven member in the form of a rope in which the periphery of the wheel includes a pair of divergent surfaces and a groove having a plurality of circumferentially spaced and arranged impressions therein which are radially and circumferentially curved with the tapering portions of the impressions extending along the circumference of the wheel rather than radially thereof to provide a drive connection between the wheel and rope.

2. Description of the Prior Art

Transmission of power by using a flexible power transmitting element engaged with a pulley rotatable about an axle has been used for many years and has included pulleys with flat surfaces for engaging flat drive belts, pulleys with a V-shaped groove for engaging V belts and similar types of structures in which friction between the pulley and flexible element serves to transmit power and to perform work. Various efforts have been made to modify rope pulleys to increase the frictional engagement between the rope and pulley but such devices usually employ radial converging surfaces, such as ribs or lugs, on the radially converging surfaces of the pulley groove which increase friction but even so, slippage will occur between the rope and pulley when a sufficient load is encountered when the compressed diameter of the rope or cable is insertable in the narrowest construction of the walls of the pulley or sheave. The following U.S. patents are typical of the developments in this type of drive systems:

1,231,856; July 3, 1917
1,458,425; June 12, 1923
2,875,981; March 3, 1959
3,302,932; February 7, 1967
3,714,838; February 6, 1973

SUMMARY OF THE INVENTION

An object of the present invention is to provide a drive power transmission element in the form of a simple machine in which a rotatable wheel is provided with a groove in the periphery thereof which includes a plurality of impressions in the form of radially and circumferentially curved impressions in which the tapering surfaces are disposed along the line of the circumference rather than radially of the wheel.

Another object of the invention is to provide a drive element in the form of a wheel including a pair of elements in which each of the elements of the pair have a plurality of impression with the smaller dimension portions of the impressions being disposed in adjacent and communnicating relation so that the wheel, when assembled, and when receiving a rope or compressible filament therein will increase the density of the rope which meshes with the tapering impressions thereby creating a leverage action against the walls of the grooves which vary in distance from one another at various points of linear distance along the circumference of the wheel. Thus, the compressible filament is locked with a resistance equal to the load which is applied with the walls of the tapering impressions being smooth surfaces which do not provide any estimable coefficient of friction especially when compared with a rough, sharp, irregular or projecting surface.

Another very important object of the invention is to provide a drive element for the transmission of power between a compressible filament such as a rope and a wheel having a uniquely constructed peripheral groove in which slippage is eliminated by compression of the filament or rope.

A still further object of the invention is to provide a drive transmission element which is quite simple in construction, easy to utilize in various power transmission arrangements and efficient in transfer of driving force.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
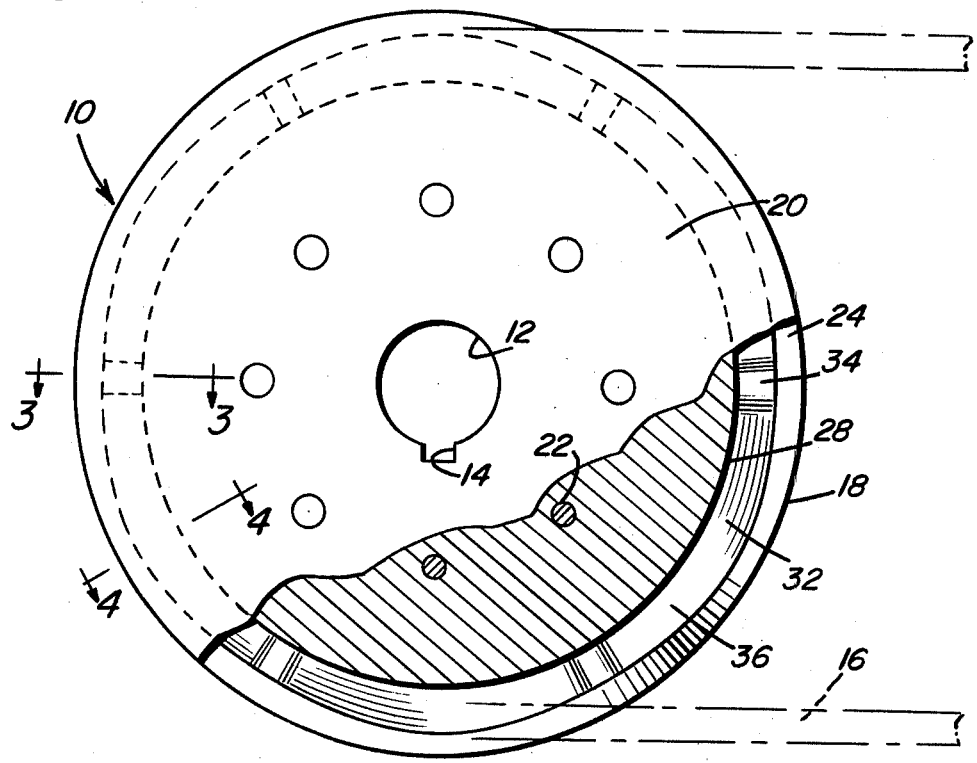
FIG. 1 is a side elevational view, with portions broken away, illustrating the present invention.
Figure 2:
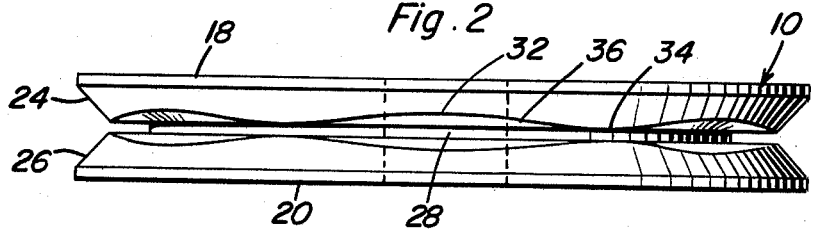
FIG. 2 is an edge view of the drive wheel.

The drive power transmission element of the present invention is in the form of a generally circular wheel designated by reference numeral 10 and including a central aperture 12 for mounting on a shaft or axle with the aperture 12 including a keyway 14 communicated therewith to receive a key for locking the wheel 10 to a shaft or axle of rotation therewith so that power may be transmitted from the wheel to the axle or from the axle to the wheel in a positive manner. Engaged with the wheel 10 is a flexible compressible filament 16 which, for the purposes of description, will be considered a rope although other equivalent types of flexible compressible filaments may be employed. As illustrated, the wheel 10 is constructed of two plates 18 and 20 which are secured rigidly together in face to face relationship by a plurality of screw threaded fasteners 22 which may be conveniently countersunk into one plate and screw threaded into the other and terminating flush therewith thus providing flat surfaces on the wheel 10.

As illustrated in the drawings, the peripheral edge of the plate 18 is provided with an inclined bevel 24 and the peripheral edge of the plate 20 is provided with a similar inclined bevel 26 around the periphery thereof so that the beveled surfaces or inclined surfaces 24 and 26 coact with each other when the plates 18 and 20 are secured together to form a generally V-shaped peripheral groove or recess in the wheel which may be considered similar to a V-shaped groove in the periphery of the sheave of a V-belt drive pulley.

Figure 3:
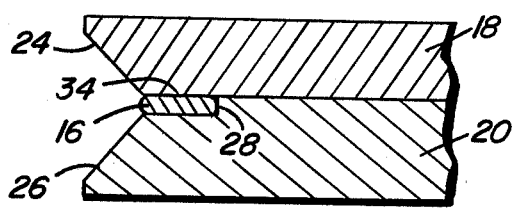
FIG. 3 is a sectional view, on an enlarged scale, taken substantially upon a plane passing along section line 3—3 of FIG. 1.
Figure 4:
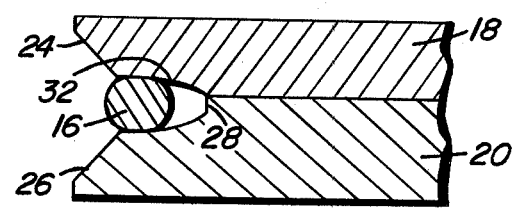
FIG. 4 is a sectional view, on an enlarged scale, taken substantially upon a plane passing along section line 4—4 of FIG. 1.

The wheel 10 has a unique and novel peripheral structure disposed at the inner edge of the beveled or inclined surfaces 24 and 26 with the peripheral surface having a peripheral groove defined therein by an offset shoulder 28 on one of the plates, as illustrated in FIGS. 3 and 4. The groove has two walls which are opposed to each other outwardly of the peripheral shoulder 28 in which each groove wall is of identical construction and includes six depressions or impressions along the line of circumference of the walls. Each impression or depression is generally designated by numeral 30 and include a major width area 32 and a minor width area 34 with the impression 30 including radially and circumferentially curved surface areas 36 in each wall. As illustrated, six cycles or impressions are provided in the periphery of the wheel 10 with each cycle including a continuous bottom wall defined by the shoulder 28 and the two walls of the impressions curving radially and along the line of circumference of the wheel from a major spaced relation to a minor spaced relation in which the major spaced relation is designated by numeral 32 and the minor spaced relation 34 is spaced therefrom with the walls between the major and minor spaced relationships tapering inwardly as indicated by numeral 36 to generally form a curved configuration with the walls at the minor dimension 34 being substantially parallel and opposed as illustrated in FIG. 3 and the walls at other places being curved as indicated in FIG. 4. This tapering construction of the walls of the impressions 30 provides for compression of the rope 16 so that the density of the rope engaging the tapering surfaces 36 opposed to the application of the load to the rope will securely lock the rope to the wheel 10 in a manner that will prevent slippage.

Figure 5:
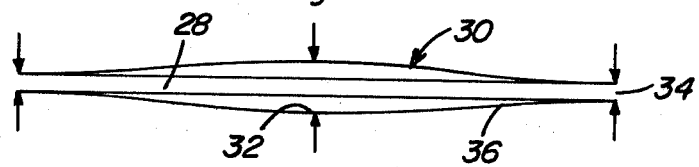
FIG. 5 is a developed section of the wall surfaces of one cycle of the periphery of the drive element illustrating the tapering construction of the impressions.

In one practical embodiment of the invention which has been successfully tested, a 9-inch diameter wheel was provided with the two plates being joined together with the width of the shoulder 28 being ⅛ inch so that the minor transverse dimension or constriction 34 is ⅛ inch wide and the major dimension at 32 is ⅜ inch wide and the developed linear distance between point 32 and point 34 in FIG. 5 is two inches. The dimensional characteristics may vary insofar as the diameter of the wheel and thickness of the wheel is concerned but the ratio of the minor dimension or constriction and the major dimension or constriction should remain approximately a one to two or three ratio for compression of common rope with the taper from the maximum constriction at point 32 to the minor constriction at point 34 being smooth and straight with the walls being curved to define a cycloidal transition from the walls at point 34 to the curved walls at a point approaching point 32.

The construction of the wheel will transmit power between the wheel and rope, round belt, cable or the like without slippage with the compression of the rope preventing slippage. The compression locking action is the function of the impressions 30 in each wall of the tapered groove. The equally spaced impressions mesh with the round belt, rope or cable with the tapering construction of the opposed pairs of impressions compressing the round belt, rope or cable and increasing the density thereof thus connecting the round belt, rope or cable to the wheel. In the test model of the invention dimensioned as set forth above, a 5/16 inch diameter solid braided nylon rope was employed with the rope or cord positioned onto the wheel with a tail length of the cord hanging toward the floor and the other end of the cord was connected to a load of 1000 pounds and torque exerted on the wheel in a direction to lift the load. When the nylon cord has been stretched to near breaking point, the apparatus was stopped and it was noted that the cord had not and did not slip even though tangentially held by only one pair of impressions in the periphery of the wheel and the tail length of the nylon cord was hanging free and completely slack while the portion of the cord running to the load was stretched out to near its breaking point.

Even though the walls of the impressions are smooth surfaces and do not provide any substantial coefficient of friction, slippage was eliminated by virtue of compression of the rope with the compression of the rope increasing the density thereof with the rope being locked with a resistance equal to an infinite load as the load is applied. The impressions in which the taper is in the direction or line of circumference provides the mechanical function of locking the rope to the wheel in a more positive relationship for transferring driving force therebetween.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A drive power transmission element comprising a generally circular wheel adapted to be rigidly connected to an axle for rotational movement about an axis, said wheel including a generally V-shaped peripheral recess defined by a pair of radially outwardly diverging smooth surfaces terminating at the periphery of the wheel, the radially inner periphery of the recess having a radially extending peripheral groove communicating therewith for receiving a flexible, compressible filament, said groove being defined by a pair of spaced walls and an inner shoulder concentric with the periphery of the wheel and means incorporated into the groove to provide a driving connection between the wheel and filament, said means including a plurality of equally spaced circumferentially extending impressions in each wall of the groove, said impressions being arranged in aligned pairs including a minor constriction area having wall portions spaced apart a minimum distance and a major constriction area having a pair of opposed curved walls spaced apart a major dimension with the area between the major constriction and the minor constriction being defined by opposed, smooth, radially curved wall surfaces curving circumferentially inwardly in the line of circumference of the wheel toward the minor constriction area for compressing the filament to increase the density thereof adjacent the minor constriction area for locking the filament and wheel in relation to each other when a load is transmitted therebetween.

2. The structure as defined in claim 1 wherein the transverse dimension of the minor construction is approximately ⅓ of the transverse dimension of the major constriction, said walls including six equally spaced pairs of impressions with the impressions being continuously arranged around the periphery of the wheel, said groove having a bottom width equal to the transverse dimension of the minor constriction with the walls at the minor constriction area being substantially radially parallel.

* * * * *